U S008991941B2

(12) United States Patent
Gotoh et al.

(10) Patent No.: US 8,991,941 B2
(45) Date of Patent: Mar. 31, 2015

(54) VEHICLE BRAKE APPARATUS (75) Inventors: Masaru Gotoh, Saitama (JP);
Kunimichi Hatano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 13/333,001

(22) Filed: Dec. 21, 2011

(65) Prior Publication Data
US 2012/0326491 A1 Dec. 27, 2012

(30) Foreign Application Priority Data

Dec. 22, 2010 (JP) ................. 2010-285835

(51) Int. Cl.
*B60T 8/40* (2006.01)
*B60T 13/66* (2006.01)
*B60T 17/18* (2006.01)
*B60T 17/22* (2006.01)

(52) U.S. Cl.
CPC ............. *B60T 13/662* (2013.01); *B60T 8/4081* (2013.01); *B60T 17/18* (2013.01); *B60T 17/221* (2013.01)
USPC .................................... 303/116.2; 303/116.1

(58) Field of Classification Search
USPC ................. 303/116.1, 116.2, 119.1
See application file for complete search history.

(56) References Cited

U.S. PATENT DOCUMENTS

| 6,315,370 | B1 * | 11/2001 | Feigel et al. | ............... | 303/115.2 |
| 8,007,056 | B2 * | 8/2011 | Ohkubo et al. | ........... | 303/122.05 |
| 8,152,244 | B2 * | 4/2012 | Yanai et al. | .............. | 303/122.09 |

| 2002/0084693 | A1 | 7/2002 | Isono et al. | | |
| 2008/0169702 | A1 * | 7/2008 | Ohnishi | ..................... | 303/119.1 |
| 2009/0315391 | A1 * | 12/2009 | Tanaka et al. | .............. | 303/113.5 |

FOREIGN PATENT DOCUMENTS

| CN | 1374218 A | 10/2002 | | |
| DE | 10 2004 027 256 A1 | 1/2005 | | |
| JP | 11115739 A * | 4/1999 | ............. | B60T 13/66 |
| JP | 2002-200973 A | 7/2002 | | |
| JP | 2002-255021 A | 9/2002 | | |
| JP | 3550975 B2 | 8/2004 | | |
| JP | 2010-105441 A | 5/2010 | | |

OTHER PUBLICATIONS

Machine Translation of JP 11-115739 (no date).*
Examination report issued Jun. 20, 2014 in the corresponding DE patent application 102011089614.7 with the English translation thereof.
Chinese Office Action issued on Jan. 13, 2014 in the corresponding CN Patent Application 201110433314.7.

* cited by examiner

*Primary Examiner* — Nicholas J Lane
(74) *Attorney, Agent, or Firm* — Carrier Blackman & Associates, P.C.; Joseph P. Carrier; Fulchand P. Shende (57) ABSTRACT A vehicle brake apparatus in which a self-locked state of a cut-off valve is quickly relieved if the valve becomes stuck in the self-locked state. The vehicle brake apparatus comprises a master cylinder to have wheel cylinders generate a braking force, master cut-off valves of a normally open type, a slave cylinder electrically driven to apply a braking force to the wheel cylinders. The apparatus also includes pressure sensors for detecting brake fluid pressures generated by the master cylinder and the slave cylinder, and out-valves through which the brake fluid pressure on the wheel cylinders is reduced. If the brake fluid pressure corresponding to a depressing stroke of a brake pedal becomes higher than a valve openable pressure on the master cut-off valves while the brake pedal is being operated, the brake fluid pressure on the wheel cylinders is reduced through the out-valves.

1 Claim, 6 Drawing Sheets

VEHICLE BRAKE APPARATUS

CROSS REFERENCE TO RELATED APPLICATIONS

This application claims the foreign priority benefit under 35 U.S.C. §119 of Japanese Patent Application No. 2010-285835 filed on Dec. 22, 2010, the disclosure of which is incorporated herein by reference.

FIELD OF THE INVENTION

The present invention relates to a vehicle brake apparatus which has a cut-off valve installed between a master-cylinder and wheel cylinders and a brake fluid source installed between the cut-off valve and the wheel cylinders.

DESCRIPTION OF THE RELATED ART

The vehicle brake apparatus has a master-cylinder and wheel cylinders, which are connected through a brake fluid passage. When a driver depresses a brake pedal, an upstream brake fluid pressure is generated in the master cylinder. In the vehicle brake apparatus of, what we call, a brake-by-wire (BBW) type, the upstream brake fluid pressure is cut off by a cut-off valve and not applied to the wheel cylinders and a downstream brake fluid pressure, which is made commensurate with not only a depressed depth of the brake pedal but also other physical quantities, is generated in a brake fluid source. This downstream brake fluid pressure is applied to the wheel cylinders to be put to work.

This vehicle brake apparatus of BBW type is a servo system, in which a target downstream brake fluid pressure that is determined based on the brake depressing force by a driver and is larger than the upstream brake fluid pressure is applied to the wheel cylinders when the vehicle brake apparatus is operating in order. Accordingly the upstream brake fluid pressure is kept smaller than the downstream brake fluid pressure in the vehicle brake apparatus of BBW type (upstream brake fluid pressure<downstream brake fluid pressure) when it is operational. There is a cut-off valve installed between the master cylinder in which the upstream brake fluid pressure is generated and the wheel cylinders to which the downstream brake fluid pressure is applied. The cut-off valve has a valve body to which is applied a differential pressure between the upstream brake fluid pressure and the down stream brake fluid pressure. When the vehicle brake apparatus is operational without failure, the cut-off valve is kept closed to have the master cylinder cut off from the wheel cylinders. In order to ensure that the cut-off valve is kept closed, the installed cut-off valve has a valve body disposed on the downstream brake fluid pressure side from a valve seat of the cut-off valve to have the differential pressure between the upstream brake fluid pressure and the downstream brake fluid pressure applied to the valve body and keep the valve body pressed against the valve seat. When the cut-off valve is closed, both a valve driving force and the differential pressure, both of which act to keep the valve body pressed against the valve seat, are applied to the valve body to ensure that the cut-off valve is kept closed.

The cut-off valve is a normally open type valve to be closed by applying electricity because of a fail-safe design. For instance, in case the BBW type brake can not work because of a failure on a vehicle brake apparatus, the normally open cut-off valve that is ordinarily closed is opened and the master cylinder becomes in communication with the wheel cylinders. Then on depressing a brake pedal as usual, a driver stops a vehicle as safely as without the failure on the vehicle brake apparatus, because the upstream brake fluid pressure generated in the master cylinder is directly applied to the wheel cylinders.

With respect to the vehicle brake apparatus of the BBW type, Japanese Patent No. 3550975 discloses a brake fluid control device to release the wheel cylinder brake fluid pressure as soon as the brake operation ends to decrease the differential pressure applied to the cut-off valve between the upstream brake fluid pressure and the downstream brake fluid pressure and easily open the cut-off valve. This brake fluid control device is intended to prevent a high wheel cylinder pressure from remaining between the cut-off valve and the wheel cylinders after a brake operation is finished and have the cut-off valve opened properly without a delay, because the high differential pressure derived from the differential pressure generated between both sides of the cut-off valve during the brake operation can become a force acting to prevent the cut-off valve from opening.

However if the BBW type brake operation starts up by switching on an ignition switch of a vehicle with a brake pedal depressed strongly by a driver and displaced a relatively large depressed stroke downward, the wheel cylinder brake fluid pressure is increased by a high pressure source according to the brake depressing force and becomes so high that it takes longer than the driver expects to stop the wheels from being braked, because it takes a longer time than in the ordinary operation to release (reduce) the wheel cylinder brake fluid pressure if the wheel cylinder brake fluid pressure is released as soon as it becomes high.

Figure 6A:
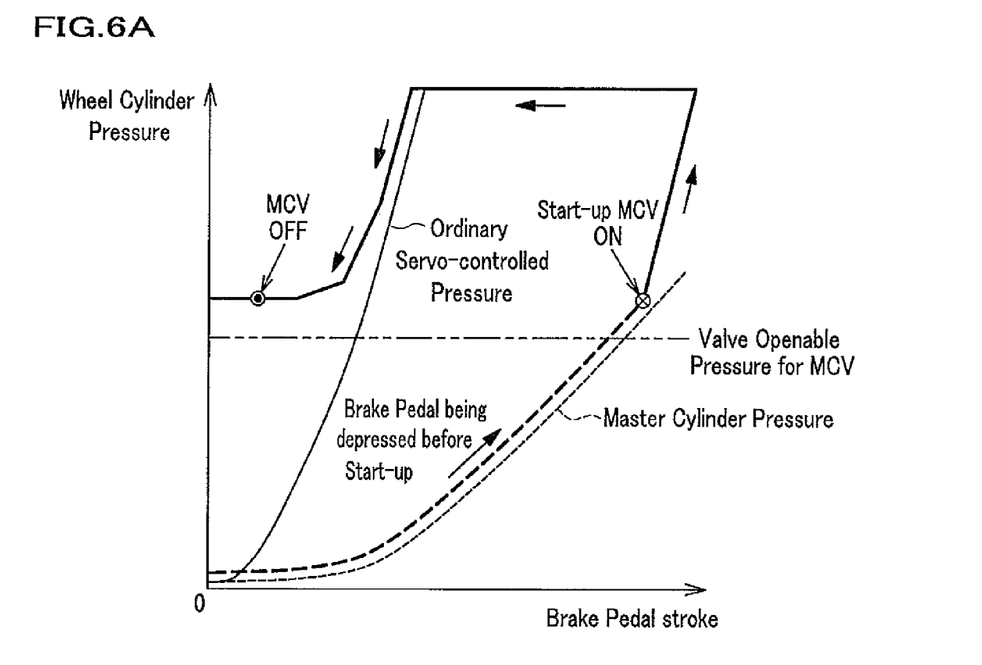
FIG. 6A is a schematic graph indicating a relation between a brake pedal depressing depth and a wheel cylinder brake fluid pressure for a vehicle brake apparatus of the prior art.

The above mentioned is explained specifically as follows. As is shown in FIG. 6A, if a driver switches on the ignition switch while depressing the brake pedal as strongly as the brake pedal comes in the vicinity of a floor surface (see a thick broken line in FIG. 6A), the brake operation control starts up with the wheel cylinder brake fluid pressure which is higher than a valve openable pressure on a master cut-off valve (MCV Openable Pressure) above which the master cut-off valve (MCV) does not open and deviates from the ordinary brake servo-control (the system starts up with the brake pedal being depressed strongly). After the brake operation control starts up, electricity is applied to a solenoid coil in the cut-off valve and the solenoid coil is switched on (see MCV Turned ON in FIG. 6A) and the cut-off valve is closed with the valve body driven to and pressed against the valve seat. As a result, the upstream brake fluid pressure on the master cylinder side is cut off from the downstream brake fluid pressure on the wheel cylinder side with the cut-off valve kept closed.

In this case, since the wheel cylinder brake fluid pressure of the downstream brake fluid pressure remains higher than the valve openable pressure on the cut-off valve, if electricity is stopped from being supplied to the cut-off valve immediately after the driver releases the brake depressing force to have the brake pedal come back to the initial position (see MCV Turned OFF in FIG. 6A), which usually leads to the closed cut-off valve being opened, the cut-off valve is kept self-locked by the wheel cylinder brake fluid pressure that is higher than the valve openable pressure on the cut-off valve (see a chain dougle-dashed line in FIG. 6A) and does not open. Accordingly there happens a case in which the closed cut-off valve can not be opened quickly with the normally open cut-off valve self-locked and it takes a longer time than in the ordinary brake operation control to open the closed cut-off valve to release the wheel cylinder brake fluid pressure.

Figure 6B:
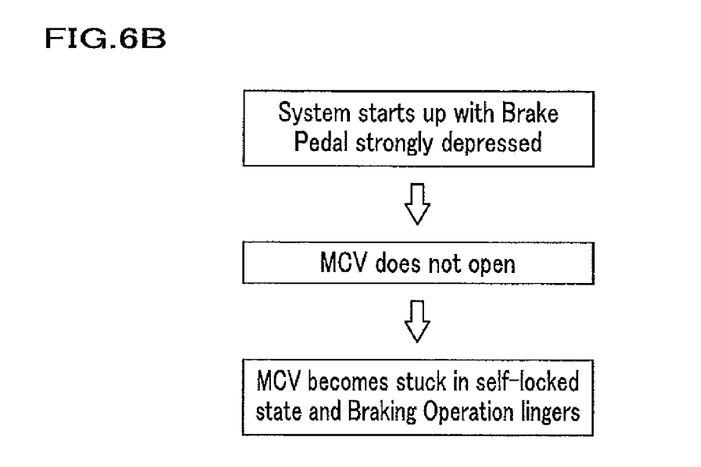
FIG. 6B is a flowchart indicating a mechanism for a cut-off valve to become self-locked.

The above mentioned problem is explained also in the following way. If the vehicle brake apparatus of the BBW type starts up with the wheel cylinder brake fluid pressure higher than the valve openable pressure on the cut-off valve, the normally open cut-off valve becomes stuck in the self-locked state and it takes a longer time than in the ordinary operation to open the cut-off valve that is closed. As a result, a higher pressure than the valve openable pressure on the cut-off valve is kept applied to the wheel cylinders until the cut-off valve is opened and the wheels are kept braked for a longer time than the driver expects (see FIG. 6B).

The present invention is intended to solve the above mentioned problem and provide a vehicle brake apparatus to quickly relieve the self-locked state of the cut-off valve when the cut-off valve is self-locked with the wheel cylinder brake fluid pressure becoming higher than the valve openable pressure on the cut-off valve during the brake operation control.

SUMMARY OF THE INVENTION

In order to achieve the above mentioned objective, the vehicle brake apparatus of the present invention has a specific feature of a vehicle brake apparatus comprising, a cut-off valve of a normally open type connected with wheel cylinders, a first brake fluid pressure generating unit which is connected with the wheel cylinders through the cut-off valve and generates a first brake fluid pressure to have wheel cylinders generate a braking force, the first brake fluid pressure being generated in response to a brake pedal being depressed by a driver and applied to the wheel cylinders while the cut-off valve is open, a second brake fluid pressure generating unit including an actuator that is electrically driven to apply a braking force to the wheel cylinders and generate a second brake fluid pressure, which has the wheel cylinder generate a braking force and is applied to the wheel cylinders while the cut-off valve is kept closed, the second brake fluid pressure being commensurate with a stroke by which the brake pedal is depressed by the driver, a brake fluid pressure detection sensor detecting a wheel cylinder brake fluid pressure applied to the wheel cylinders, the wheel cylinder brake fluid pressure corresponding to the first brake fluid pressure or the second brake fluid pressure, wherein the wheel cylinder brake fluid pressure is decreased when the wheel cylinder brake fluid pressure applied to the wheel cylinders becomes higher than a valve openable pressure above which the cut-off valve does not open while the brake pedal is being operated.

According to this feature, if the brake fluid pressure on the wheel cylinder side becomes higher than the valve openable pressure on the cut-off valve while the brake pedal is being operated, the brake fluid pressure on the wheel cylinders is decreased. Therefore, a brake fluid pressure of a summation of a brake fluid pressure generated by the first brake fluid pressure generating unit and a brake fluid pressure generated by the actuator is prevented from being applied to the wheel cylinders and the self-locked state of the cut-off valve is quickly relieved.

The vehicle brake apparatus of the present invention has other feature of the vehicle brake apparatus further comprising, a reservoir connected with the wheel cylinders, a pressure reduction valve installed between the wheel cylinders and the reservoir and being opened to make the wheel cylinders in communication with the reservoir to reduce the wheel cylinder pressure, wherein the wheel cylinder pressure applied to the wheel cylinders is decreased through the pressure reduction valve if the cut-off valve is closed when the first brake fluid pressure becomes higher than the valve openable pressure with the cut-off valve opened.

According to this feature, the following effect is obtained. If the cut-off valve is closed when the brake pedal is strongly depressed with the cut-off valve opened, a brake fluid pressure, which is commensurate with a stroke by which the brake pedal is depressed, is generated on the downstream side (wheel cylinder side) of the cut-off valve and is higher than the valve openable pressure on the cut-off valve. Then the cut-off valve becomes stuck in the self-locked state by the differential brake fluid pressure from the upstream brake fluid pressure, which is attributed to the brake fluid pressure on the wheel cylinders higher than the valve openable pressure on the cut-off valve. However the high brake fluid pressure on the wheel cylinder is released through the pressure reduction valve and lowered. As a result, the self-locked state of the cut-off valve is quickly relieved and the cut-off valve is opened.

The vehicle brake apparatus of the present invention has other feature that the wheel cylinder brake fluid pressure is decreased with the actuator if the second brake fluid pressure becomes higher than the valve openable pressure with the cut-off valve kept closed.

According to this feature, since the actuator is in operation with the cut-off valve kept closed, the brake fluid pressure on the wheel cylinder disposed downstream of the cut-off valve is accurately reduced with the actuator. As a result, the self-locked state of the cut-off valve is quickly relieved and the cut-off valve is opened.

The vehicle brake apparatus of the present invention has the other feature of the vehicle brake apparatus comprising, a reservoir connected with the wheel cylinders, a pressure reduction valve installed between the wheel cylinders and the reservoir and being opened to make the wheel cylinders in communication with the reservoir to reduce the wheel cylinder pressure, wherein the wheel cylinder brake fluid pressure is decreased with the actuator and the pressure reduction valve if the second brake fluid pressure becomes higher than the valve openable pressure with the cut-off valve kept closed.

According to this feature, if the cut-off valve becomes stuck in the self-locked state with the brake fluid pressure on the wheel cylinders downstream of the cut-off valve being higher than the valve openable pressure on the cut-off valve while the brake pedal is being operated, the brake fluid pressure on the wheel cylinders downstream of the cut-off valve is reduced with the actuator and the pressure reduction valve, which are put to work in cooperation, and the self locked state of the cut-off valve is appropriately relieved. In this case, making use of the actuator and the pressure reduction valve which work in cooperation, the brake fluid pressure higher than the valve openable pressure on the cut-off valve is more efficiently reduced and the self-locked state of the cut-off valve is qyickly relieved.

DETAILED DESCRIPTION OF THE PREFERRED EMBODIMENT

Hereinafter embodiments of the present invention are explained in detail with reference to appropriate figures.

Figure 1:
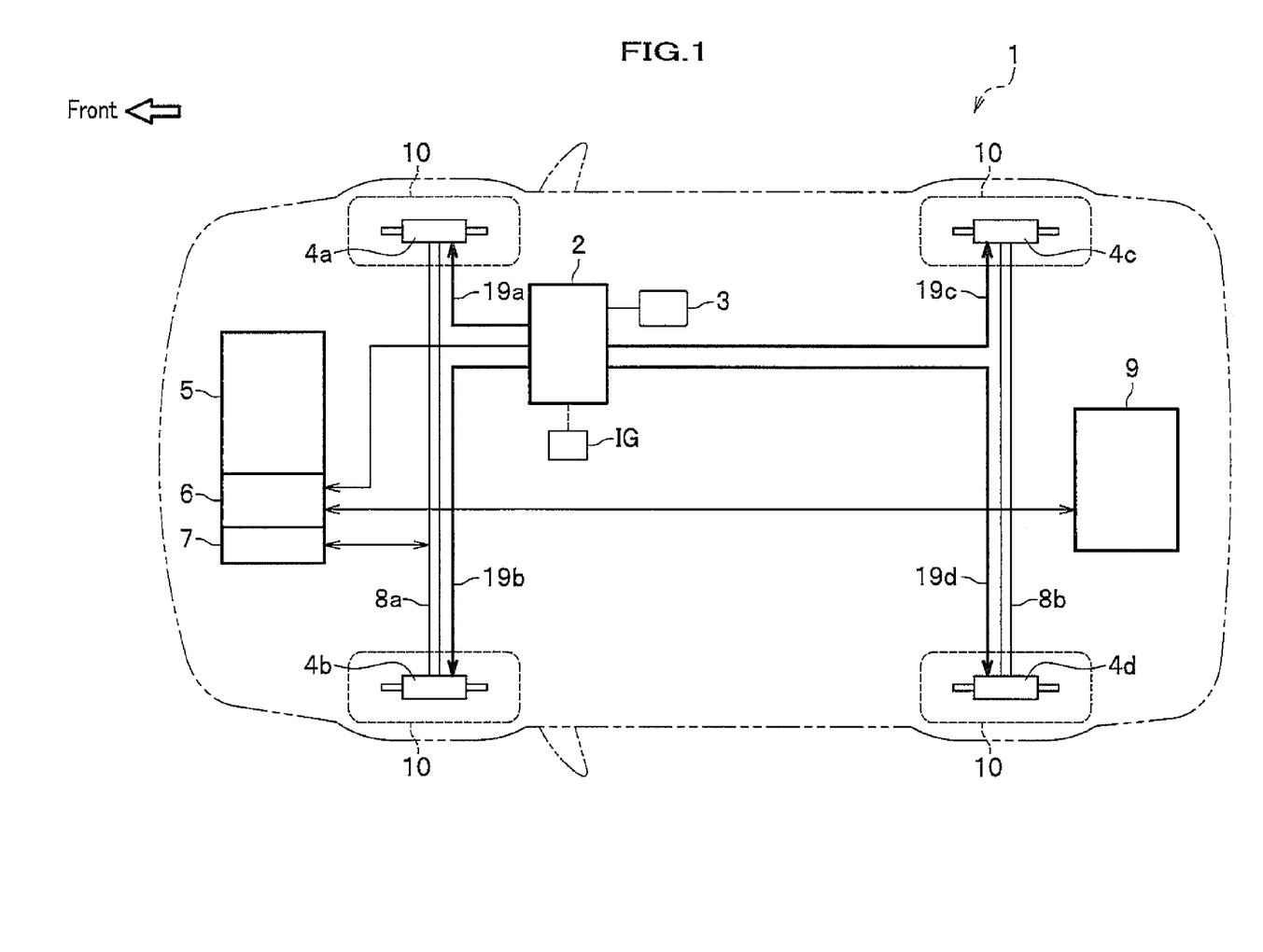
FIG. 1 is a schematic drawing of a vehicle on which a vehicle brake apparatus according to the present invention is installed.

FIG. 1 is a schematic drawing of a vehicle 1 on which a vehicle brake apparatus 2 according to the present invention is installed. The vehicle 1 is equipped with four wheels 10, among which a couple of front wheels 10 are connected with an axle 8a and the other couple of rear wheels are connected with an axle 8b. A driving force generated by at least one of an engine 5 and a motor (electrical motor) 6 is transmitted through a transmission and the axle 8a to the couple of the front wheels 10 and the front wheels 10 are made to be rotating.

Additionally mechanical rotation energy of the front wheels 10 that are rotating is transmitted through the transmission 7 to the electrical motor 6, at which the mechanical rotation energy is converted to regenerated energy of electrical energy. Accordingly the front wheels 10 and the axle 8a can be braked through energy regenerative braking. The regenerated energy is stored in a battery 9 and used for generating a driving force through the electrical motor 6. As is shown in FIG. 1, this embodiment is explained with a hybrid vehicle as an example and the vehicle brake apparatus 2 of the embodiment on the present invention is applied not only to the hybrid vehicle but also to the electric vehicle such as a vehicle as described in FIG. 1 without the engine 5.

Wheel cylinders 4a, 4b, 4c, 4d are respectively attached to the four wheels 10. The wheel cylinder 4a is connected to the vehicle brake apparatus 2 through a brake fluid passage 19a. When a brake fluid pressure in the wheel cylinder 4a is increased through the brake fluid passage 19a by the vehicle brake apparatus 2, the wheel cylinder 4a is operated and the wheel 10 for the wheel cylinder 4a is braked. In a similar way, the wheel cylinder 4b is connected to the vehicle brake apparatus 2 through a brake fluid passage 19b. When a brake fluid pressure in the wheel cylinder 4b is increased through the brake fluid passage 19b by the vehicle brake apparatus 2, the wheel cylinder 4b is operated and the wheel 10 for the wheel cylinder 4b is braked. The wheel cylinder 4c is connected to the vehicle brake apparatus 2 through a brake fluid passage 19c. When a brake fluid pressure in the wheel cylinder 4c is increased through the brake fluid passage 19c by the vehicle brake apparatus 2, the wheel cylinder 4c is operated and the wheel 10 for the wheel cylinder 4c is braked. The wheel cylinder 4d is connected to the vehicle brake apparatus 2 through a brake fluid passage 19d. When a brake fluid pressure on the wheel cylinder 4d is increased through the brake fluid passage 19d by the vehicle brake apparatus 2, the wheel cylinder 4d is operated and the wheel 10 for the wheel cylinder 4d is braked. Accordingly the four wheels and the axles 8a, 8b are braked with a braking force on the brake fluid pressure that is generated by the vehicle brake apparatus 2 and the wheel cylinders 4a, 4b, 4c, 4d.

Braking the couple of the front wheels 10 and the axle 8a is performed with the regenerative braking force on the electrical motor 6 and the braking force on the brake fluid pressure generated by the wheel cylinders 4a, 4b, 4c, 4d. These two braking forces are controlled by the vehicle brake apparatus 2. To be specific, a distribution ratio of the regenerative braking force to the braking force on the brake fluid pressure is appropriately changed and there is a case in which the the regenerative braking is stopped.

In this embodiment, the wheel cylinders 4a, 4b, 4c, 4d are installed respectively for the front right wheel, the front left wheel, the rear right wheel and the rear left wheel of the vehicle 1. This is just an example for how the wheel cylinders are installed and the wheel cylinders may be installed in other ways for the present invention. For instance, the wheel cylinders 4a, 4b, 4c, 4d may be installed respectively for the front right wheel, the rear left wheel, the front left wheel and the rear right wheel of the vehicle 1.

A brake pedal 3 is attached to the vehicle brake apparatus 2 and operated by a driver. The brake pedal 3 is an input means for the vehicle brake apparatus 2 while the wheel cylinders 4a, 4b, 4c, 4d constitute an output means. On switching on an ignition switch IG the vehicle brake apparatus 2 as well as the vehicle 1 is started up. On switching off the ignition switch IG, the vehicle brake apparatus 2 as well as the vehicle 1 is stopped.

Figure 2:
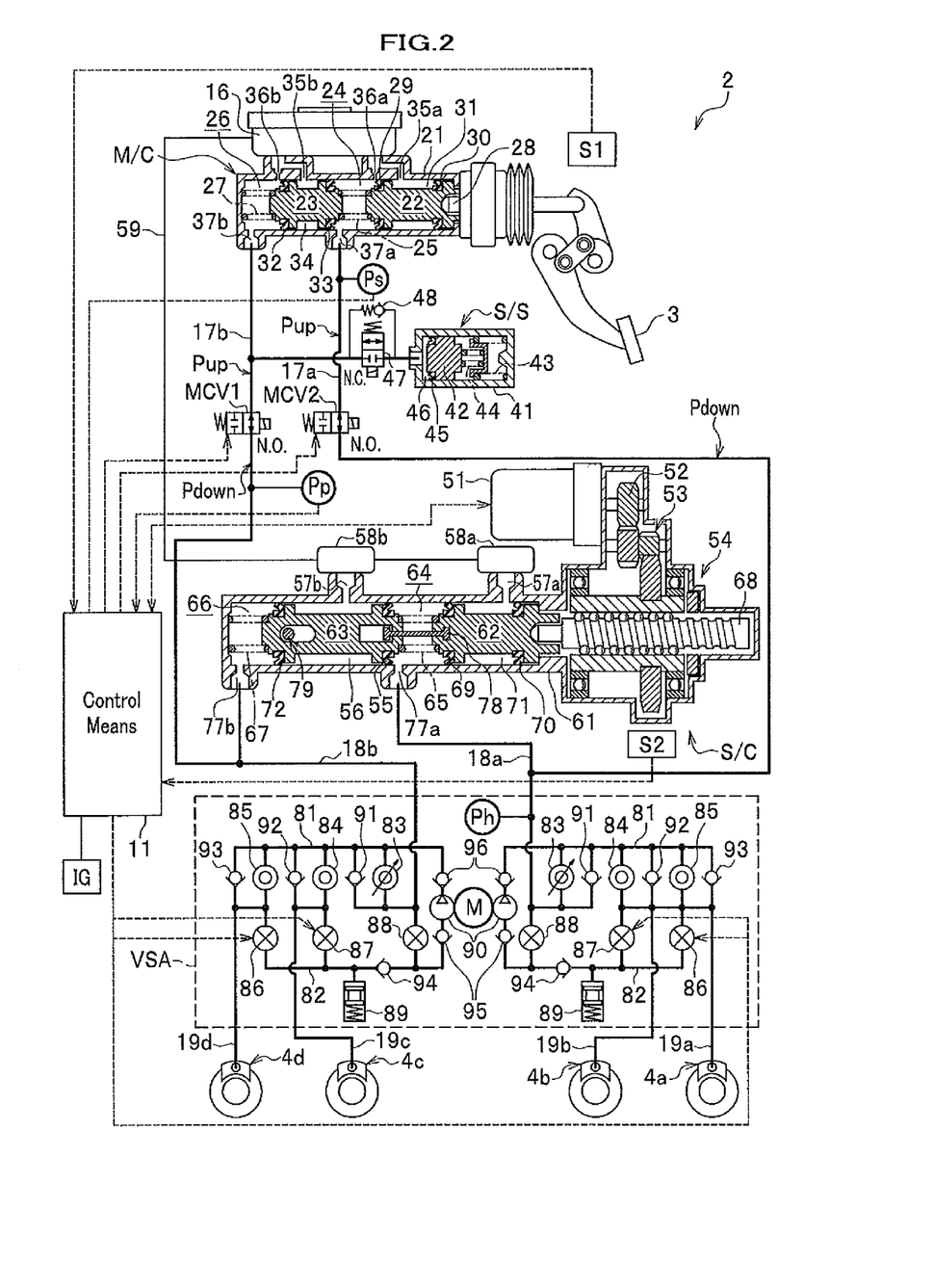
FIG. 2 is a schematic view of a vehicle brake apparatus according to the present invention which is not in operation.

FIG. 2 is a schematic view of a vehicle brake apparatus 2 according to the present invention which is not in operation. FIG. 2 shows a whole apparatus of the vehicle brake apparatus as the vehicle brake apparatus 2. The vehicle brake apparatus 2 comprises a brake pedal 3, the wheel cylinders 4a, 4b, 4c, 4d and brake fluid passages 19a, 19b, 19c, 19d. The vehicle brake apparatus 2 further comprises a stroke sensor S1 to detect a depressed stroke of the brake pedal 3 (depressed stroke detection means), a master cylinder M/C (brake fluid pressure generating means) of a tandem type which has a first brake fluid chamber 26 and a second brake fluid chamber 24 and is capable of generating a brake fluid pressure by depressing the brake pedal 3, brake fluid pressure passages 17a-18a-19a,17a-18a-19b which constitute a first brake fluid pressure system and connect the second brake fluid pressure chamber 24 of the master cylinder M/C with a plurality of wheel cylinders 4a,4b and brake fluid pressure passages 17b-18b-19c,17b-18b-19d which constitute a second brake fluid pressure system and connect the first brake fluid pressure chamber 26 of the master cylinder M/C with a plurality of wheel cylinders 4c,4d.

The vehicle brake apparatus 2 further comprises a slave cylinder (Electrically brake fluid pressure generating means). The slave cylinder S/C is connected with the brake fluid pressure passage 17a-18a of the first brake fluid pressure system and the brake fluid pressure passage 17b-18b of the second brake fluid pressure system. The slave cylinder S/C is capable of generating an downstream brake fluid pressure $P_{down}$ which is determined based on a depressed stroke of the brake pedal detected by a stroke sensor S1 and is to be applied to the brake fluid pressure passage 18a of the first brake fluid pressure system and the brake fluid pressure passage 18b of the second brake fluid pressure system.

The vehicle brake apparatus 2 further comprises master cut-off valves MCV1, MCV2, both of which are of a normally open type. The master cut-off valve MCV1 is installed on the brake fluid pressure passage 17b of the second brake fluid pressure system between the first brake fluid pressure chamber 26 of the master cylinder M/C and a first brake fluid pressure chamber 66 of the slave cylinder S/C. The master cut-off valve MCV2 is installed on the brake fluid pressure passage 17a of the second brake fluid pressure system between the second brake fluid pressure chamber 24 of the master cylinder M/C and a second brake fluid pressure chamber 64 of the slave cylinder S/C. Each of the master cut-off valves MCV1, MCV2 is closed by a valve driving force generated only when electricity is being applied according to an instruction from a control means 11.

The Vehicle 2 further comprises pressure sensors (pressure detection means) $P_p$, $P_s$. The pressure sensor $P_p$ is installed on a the brake fluid pressure passage 17b of the second brake fluid pressure system between the master cut-off valve MCV1 and the wheel cylinders 4c, 4d. The pressure sensor $P_p$ detects (measures) the downstream brake fluid pressure $P_{down}$ on the brake fluid pressure passage 17b of the second brake fluid pressure system between the master cut-off valve MCV1 and the wheel cylinders 4c, 4d. The pressure sensor $P_s$ is installed on the brake fluid pressure passage 17a of the first brake fluid pressure system between the master cut-off valve MCV2 and the master cylinder M/C. The pressure sensor $P_s$ detects a upstream brake fluid pressure $P_{up}$ on the brake fluid pressure passage 17a of the first brake fluid pressure system between the master cut-off valve MCV2 and the master cylinder M/C.

In addition to the above mentioned components of the vehicle brake apparatus 2, the vehicle brake apparatus 2 comprises such main components as a stroke simulator S/S, a vehicle stability assist VSA (registered trade mark) and the control means 11.

The stroke simulator S/S is connected with the brake fluid pressure passage 17b between the master cylinder M/C and the master cut-off valve MCV1. The stroke simulator S/S is capable of absorbing brake fluid discharged from the first brake fluid pressure chamber 26 of the master cylinder M/C.

The vehicle stability assist VSA is disposed between the slave cylinder S/C and the wheel cylinders 4a, 4b, 4c, 4d and installed between the brake fluid pressure passage 18a and the brake fluid pressure passages 19a, 19b both included in the first brake fluid pressure system and between the brake fluid pressure passage 18b and the brake fluid pressure passages 19c, 19d both included in the second brake fluid pressure system.

The control means 11 controls the downstream brake fluid pressure $P_{down}$ on the master cut-off valves MCV1, MCV2 based on the depressed stroke of the brake pedal 3 detected by the stroke sensor S1.

The master cylinder M/C comprises a cylinder 21, a second piston 22 and a first piston 23. The second cylinder 22 and the first cylinder 23 are fitted in the cylinder 21 and capable of sliding in the cylinder 21. There is a second brake fluid chamber 24 that is filled with brake fluid and defined by and disposed ahead of the second piston 22. A second return spring 25 is installed in the second brake fluid chamber 24. There is a first brake fluid chamber 26 that is filled with brake fluid and defined by and disposed ahead of the first piston 23. A first return spring 27 is installed in the second brake fluid chamber 26. The rear end of the second piston 22 is connected with a push rod 28 that is connected with the brake pedal 3. When a driver depresses the brake pedal 3, both the first piston 23 and the second piston 22 are made to move forward in the master cylinder M/C and the upstream brake fluid pressure $P_{up}$ is generated in each of the first brake fluid chamber 26 and the second brake fluid chamber 24.

There is a second back chamber 31 formed between a cap seal 29 and a cap seal 30 both included in the second piston 22. There is a first back chamber 34 formed between a cap seal 32 and a cap seal 33 both included in the first piston 23. There are a supply port 35a, a relief port 36a, an output port 37a, a supply port 35b, a relief port 36b and an output port 37b, which are formed on the cylinder 21 and disposed in this order from the rear end of the cylinder 21 to the front end of the cylinder 21. The supply port 35a is in communication with the second back chamber 31. The relief port 36a is opened on the second brake fluid pressure chamber 24 and disposed immediately in front of the cap seal 29. The output port 37a is opened on the second brake fluid pressure chamber 24. The supply port 35b is in communication with the first back chamber 34. The relief port 36b is opened on the first brake fluid pressure chamber 26 and disposed immediately in front of the cap seal 32. The output port 37b is opened on the first brake fluid chamber 26. The supply port 35a and the relief port 36a merge into one passage and are in communication with a reservoir 16. The output port 37a is connected with the brake fluid pressure passage 17a of the first brake fluid system. The output port 37b is connected with the brake fluid pressure passage 17b of the second brake fluid system.

The brake simulator S/S has a couple of springs installed in a cylinder 41. One is a second return spring 44 and the other is a first return spring 43. A spring constant of the second return spring 44 is lower than that of the first return spring 43. The second return spring 44 and the first return spring 43 are held in series in the cylinder 41 to keep pushing against a piston 42 in order to have an increase ratio of a brake counter force to the brake pedal depressed stroke being smaller until when the brake pedal 3 is depressed upto approximately half the maximum brake pedal depressed stroke and have the increase ratio of the brake counter force to the brake pedal depressed stroke being larger when the brake pedal 3 is depressed over approximately half the maximum brake pedal depressed stroke. There is a brake fluid pressure chamber 46 in the cylinder 41, which is defined by the piston 42 and disposed on the side opposite the second return spring 44 across the piston 42. The brake fluid pressure chamber 46 is filled with brake fluid and connected with through a cut-off valve 47 that is a normally close valve. There is an one way valve 48 installed in parallel with the cut-off valve 47 and the brake fluid can flow from the brake fluid pressure chamber 46 to the brake fluid pressure passage 17b of the second brake fluid pressure system through the one way valve 48 and can not flow from the brake fluid pressure passage 17b to the brake fluid pressure chamber 46 through the one way valve 48. There is a cap seal 45 attached on the piston 42 to prevent the brake fluid from leaking from the brake fluid pressure chamber 46 through between the piston 42 and the cylinder 41.

The slave cylinder S/C (Electrically brake fluid pressure generating means) comprises a cylinder 61, a first piston 63 (slave piston) and a second piston 62 (slave piston). Both the first piston 63 and the second piston 62 are fitted in the cylinder 61 and are capable of sliding in the cylinder 61. There is a second return spring 65 installed in a second brake fluid pressure chamber 64 that is defined by and disposed in front of the second piston 62. There is a first return spring 67 installed in a first brake fluid pressure chamber 66 that is defined by and disposed in front of the first piston 63. The rear end of the second piston 62 is connected with a motor 51 through a push rod 68, a ball screw mechanism 54, a deceleration mechanism 53 and a gear 52, which constitute a motor cylinder (52,53,54,68). The stroke sensor S2 (operation displacement detection means) detects an operation stroke of the second piston 62 (slave piston). The motor cylinder (52,53, 54,68) and the stroke sensor S2 constitute an electrically driven actuator (52,53,54,68,S2). When the motor 51 (electrical motor) is rotated according to a braking instruction by the control means 11, the push rod 68, the first piston 63, the second piston 62 are made to move forward to generate the downstream brake fluid pressure $P_{down}$ in each of the first brake fluid pressure chamber 66 and the second brake fluid pressure chamber 64.

There are formed a second back chamber 71 between the cap seal 69 and the cap seal 70 of the second piston 62 and a first back chamber 56 between the cap seal 72 and the cap seal 55 of the first piston 63. On the cylinder 61 are formed a return port 57a, an output port 77a, a return port 57b and an output port 77b, which are disposed in this order from the rear end to the front end of the cylinder 61, and in communication respectively with the second back chamber 71, the second brake fluid pressure chamber 64, the first back chamber 56 and the first brake fluid pressure chamber 66. The return ports 57*a*, 57*b* are further in communication respectively with reservoirs 58*a*, 58*b*, which are in communication with the reservoir 16 through a brake fluid passage 59. The output port 77*a* is in communication with the brake fluid pressure passages 17*a*, 18*a*, both of which are included in the first brake fluid pressure system. The output port 77*b* is in communication with the brake fluid pressure passages 17*b*, 18*b*, both of which are included in the second brake fluid pressure system.

In case the vehicle brake apparatus is out of order with the slave cylinder S/C unable to be put to work, both of the master cut-off valves MCV1, MCV2 of a normally open type are opened whether they are closed or not, and the cut-off valve 47 of a normally close valve is closed whether it was opened or not. As a result, the brake fluid pressure generated in the second brake fluid pressure chamber 24 of the master cylinder M/C is applied to the wheel cylinders 4*a*, 4*b* in the first brake fluid pressure system without being applied to the second brake fluid pressure chamber 64 of the slave cylinder S/C, and the brake fluid pressure generated in the first brake fluid pressure chamber 26 of the master cylinder M/C is applied to the wheel cylinders 4*c*, 4d of the second brake fluid pressure system without being applied to the first brake fluid pressure chamber 66 of the slave cylinder S/C. In this case, if any of the brake fluid pressure passages 18*b*, 19*c*, 19*d*, which are included in the first brake fluid pressure system, fails, there is a risk that the volume of the second brake fluid pressure chamber 64 becomes so large with the first piston 63 moving forward further away from the second piston 62 due to the pressure loss in the first brake fluid pressure chamber 66 that the brake fluid pressure applied to the wheel cylinders 4*a*, 4*b* is decreased. However, the distance between the first piston 63 and the second piston 62 is restricted by a restriction member 78 to a range between a minimum distance and a maximum distance and the movable range of the first piston 63 is restricted by a restriction member 79. Therefore, the volume of the second pressure chamber 66 is prevented from becoming too large to make sure that a necessary brake fluid pressure is applied to the wheel cylinders 4*a*, 4*b* and that a necessary braking force is generated by the wheel cylinders 4*a*, 4*b*, even if the brake fluid pressure in the first brake fluid pressure chamber 66 is lost.

The vehicle stability assist VSA has a structure for the first brake fluid pressure system from the brake fluid pressure passage 18*a* to the brake fluid pressure passages 19*a*, 19*b* and a structure for the first brake fluid pressure system from the brake fluid pressure passage 18*b* to the brake fluid pressure passages 19*c*, 19*d*, both of which are identical with each other. Accordingly, in order to compare the structures easily, a common sign is given to corresponding members between the first brake fluid pressure system and the second brake fluid pressure system of the vehicle stability assist VSA. Hereinafter an explanation is given only on the first brake fluid pressure system from the brake fluid pressure passage 18*a* to the brake fluid pressure passages 19*a*, 19*b*.

The vehicle stability assist VSA is equipped with the brake fluid pressure passages 81, 82 for the wheel cylinders 4*a*, 4*b* (4*c*, 4*d*) and comprises a regulator valve 83 (normally open), a one-way valve 91, an in-valve 85 (normally open), an one-way valve 93, an in-valve 84, and a one-way valve 92. The regulator valve 83 is a normally open type solenoid valve whose opening is variable and is installed between the brake fluid pressure passage 18*a* (18*b*) and the brake fluid pressure passage 81. The one-way valve 91 is installed in parallel with the regulator valve 83 and allows the brake fluid to flow in only one direction from the brake fluid pressure passage 18*a* (18*b*) to the brake fluid pressure passage 81. The in-valve 85 is a normally open type solenoid valve installed between the brake fluid pressure passage 81 and the brake fluid pressure passage 19*a* (19*d*). The one-way valve 93 is installed in parallel with the in-valve 85 and allows the brake fluid to flow in only one direction from the brake fluid pressure passage 19*a* (19*d*) to the brake fluid pressure passage 81. The in-valve 84 is a normally open type solenoid valve installed between the brake fluid pressure passage 81 and the brake fluid pressure passage 19*b* (19*c*). The one-way valve 92 is installed in parallel with the in-valve 84 and allows the brake fluid to flow in only one direction from the brake fluid pressure passage 19*b* (19*c*) to the brake fluid pressure passage 81.

The vehicle stability assist VSA further comprises an out-valve (normally close) 86, an out-valve (normally close) 87, a reservoir 89, an one-way valve 94, pump 90, one-way valves 95, 96, a motor M and a suction valve 88 (normally close). The out-valve 86 is a solenoid valve of a normally close type which is installed between the brake fluid pressure passage 19*a* (19*d*) and the brake fluid pressure passage 82 and functions as a pressure reduction valve. The out-valve 87 is a solenoid valve of a normally close type which is installed between the brake fluid pressure passage 19*b* (19*c*) and the brake fluid pressure passage 82 and functions as a pressure reduction valve. The reservoir 89 is connected with the brake fluid pressure passage 82 and stores the pressurized brake fluid from the wheel cylinders 4*a*, 4*b* when the out-valves 86, 87 are opened. The one-way valve 94 is installed between the brake fluid pressure passage 82 and the brake fluid pressure passage 81 and allows the brake fluid to flow in only one direction from the brake fluid pressure passage 82 to the brake fluid pressure passage 81. The pump 90 is installed between the one-way valve 94 and the brake fluid pressure passage 81 and supplies the brake fluid from the brake fluid pressure passage 82 to the brake fluid pressure passage 81. The one-way valves 95, 96 are installed on both sides of the pump 90 and allows the brake fluid to flow in only one direction from the brake fluid pressure passage 82 to the brake fluid pressure passage 81. The motor M drives the pump 90. The suction valve 88 is a solenoid valve of a normally close type which is installed between an intermediate portion between the one-way valve 94 and the one way valve 95 and the brake fluid pressure passage 18*a* (18*b*).

A pressure sensor (pressure detection means) Ph is installed on the brake fluid pressure passage 18*a* on a side of the vehicle stability assist VSA and detects the downstream brake fluid pressure $P_{down}$ which is generated in the slave cylinder S/C and is applied to the wheel cylinders 4*a*, 4*b* (4*c*, 4*d*). It should be understood that the other downstream brake fluid pressure $P_{down}$ applied to the wheel cylinders 4*c*, 4*d* may be regarded as the pressure detected by the pressure sensor (pressure detection means) Ph, because the brake fluid pressure passage 18*b* has as large or more or less as large a pressure as the brake fluid pressure passage 18*a* does.

Figure 3:
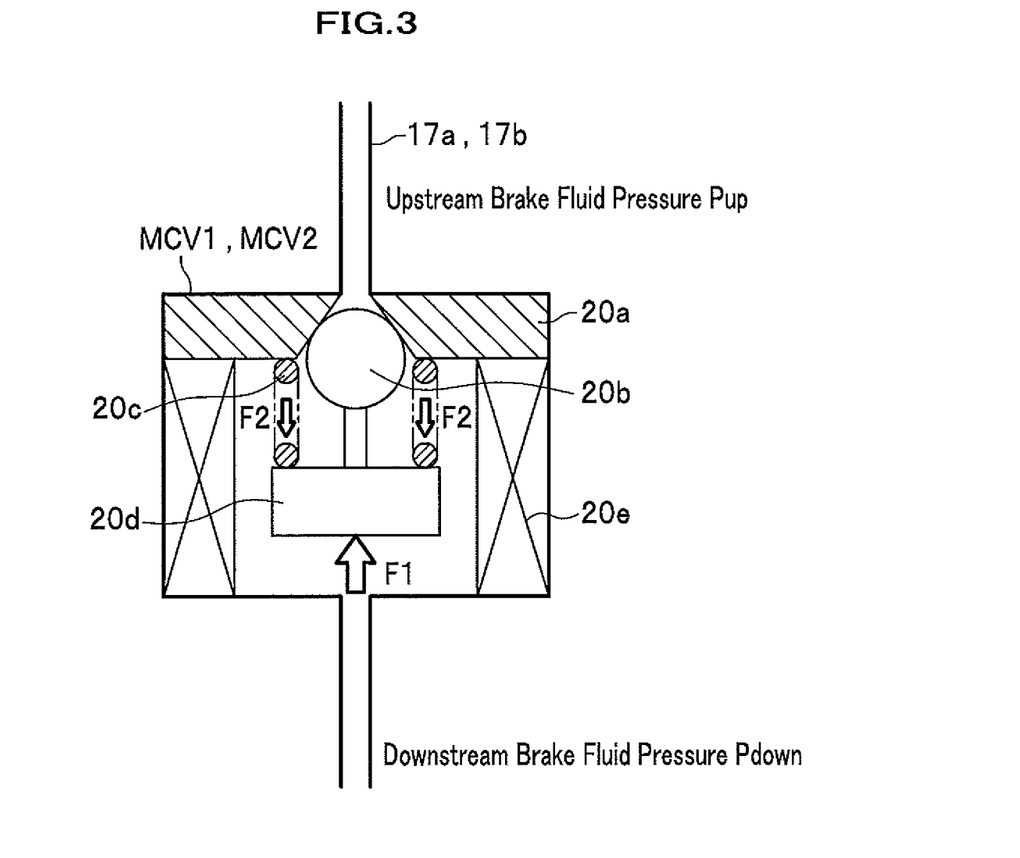
FIG. 3 is a schematic view of a master cut-off valve used in a vehicle brake apparatus according to the present invention.

In FIG. 3 is shown a structure of each of the master cut-off valves MCV1, MCV2 used for the vehicle brake apparatus 2 according to an embodiment of the present invention. If only brake fluid pressure braking is applied with the vehicle brake apparatus 2 without regeneration braking being applied, the downstream brake fluid pressure $P_{down}$, which is a predetermined magnification as large as the upstream brake fluid pressure $P_{up}$, is generated by the slave cylinder S/C in response to the upstream brake fluid pressure $P_{up}$ in the master cylinder M/C being generated on a driver's depressing force on the brake pedal 3 and is applied to the wheel cylinders 4*a*,

4b, 4c, 4d. A relation of the upstream brake fluid pressure $P_{up}$ being smaller than the downstream brake fluid pressure $P_{down}$ applies with the downstream brake fluid pressure $P_{down}$ being set to an amplified value from the upstream brake fluid pressure $P_{up}$. The master cut-off valves MCV1, MCV2 are installed between the master cylinder M/C generating the upstream brake fluid pressure $P_{up}$ and the slave cylinder S/C generating the downstream brake fluid pressure $P_{down}$.

A differential pressure between the upstream brake fluid pressure $P_{up}$ and the downstream brake fluid pressure $P_{down}$ ($P_{down} - P_{up} > 0$) is applied to a valve body 20b of each of the master cut-off valves MCV1, MCV2 in the same direction as a valve driving force. When the vehicle brake apparatus 2 is in operation, the master cut-off valves MCV1, MCV2 are kept closed to have the slave cylinder S/C cut off from the master cylinder M/C. In order to ensure that the master cylinder M/C is kept cut off from the slave cylinder S/C, the valve body 20b is disposed on the downstream brake fluid pressure $P_{down}$ side of a valve seat 20a and the differential pressure ($P_{down} - P_{up} > 0$) is applied to the valve body 20b to have the valve body 20b pressed against the valve seat 20a. The differential pressure ($P_{down} - P_{up} > 0$) as well as the valve driving force F1 is applied to the valve body 20b and the valve body 20b is kept firmly in a closed state. The valve driving force F1 is generated by applying electricity to a coil 20e and applied to a linear slider 20d. The linear slider 20d to which the valve driving force F1 is being applied moves the valve body 20b to the valve seat 20a and has the valve body 20b pressed against the valve seat 20a while depressing a spring 20c and reducing its length. As a result, each of the master cut-off valves MCV1, MCV2 becomes closed. In FIG. 3, an arrow direction of the valve driving force F1 corresponds to a self-locking direction of each of the master cut-off valves MCV1, MCV2 and if each of the master cut-off valves MCV1, MCV2 becomes stuck in a self-locked state to be explained later, the valve body 20b is kept onto the valve seat 20a with a much larger force than a spring counter force F2 being applied to the valve body 20b.

The vehicle 1 on which the vehicle brake apparatus 2 of the present embodiment is installed has the above mentioned structure in principle. Hereinafter is explained functions and effects of the vehicle brake apparatus 2.

Firstly is explained an operation of the vehicle brake apparatus 2 when the downstream brake fluid pressure $P_{down}$ becomes larger than the valve openable pressure on the master cut-off valves MCV1, MCV2 which are kept opened.

Brake control to be performed on the vehicle brake apparatus 2 gets started as soon as a driver switches on the ignition switch IG. When the brake control on the vehicle brake apparatus 2 is finished on switching off the ignition switch IG, each of the master cut-off valves MCV1, MCV2 of the normally open type becomes in an off state without electricity applied and in an opened state from a closed state on a force applied by a return spring not indicated being extended. As a result, the downstream brake fluid pressure $P_{down}$ on the wheel cylinder side is relieved and the differential pressure between the upstream brake fluid pressure $P_{up}$ on the master cylinder side and the downstream brake fluid pressure $P_{down}$ on the wheel cylinder side decreases. In FIG. 2, the vehicle brake apparatus 2 is out of operation with the ignition switch IG kept off and the master cut-off valves MCV1, MCV2 of the normally open type being in the opened state.

If the driver switches on the ignition switch IG of the vehicle brake apparatus 2 while depressing the brake pedal 3 so strongly as to have the brake pedal 3 come in the vicinity of the floor surface, the brake control gets started with the wheel cylinder brake fluid pressure being much larger than the valve openable pressure on the master cut-off valves MCV1, MCV2 as is shown in FIG. 6A (the system starts up with the brake pedal depressed strongly), which is not the case with the ordinary brake control operation starting up. Electricity is applied to each of the master cut-off valves MCV1, MCV2 on the brake control operation starting up (refer to "MCV ON" in FIG. 6A) and each of the master cut-off valves MCV1, MCV2 becomes in the closed state with the valve body 20b pressed against the valve seat 20a. As a result, the upstream brake fluid pressure $P_{up}$ is isolated from the downstream brake fluid pressure $P_{down}$ with the master cut-off valves MCV1, MCV2.

Here, whether the wheel cylinder brake fluid pressure is higher than the valve openable pressure (MCV relieving pressure) on each of the master cut-off valves MCV1, MCV2 is determined by the control means 11 on the basis of, for instance, a detection signal output from the pressure sensor Ph. The control means 11 determines whether the wheel cylinder brake fluid pressure is higher than the valve openable pressure (MCV relieving pressure) on each of the master cut-off valves MCV1, MCV2, preferably on the basis of a detection signal output from the pressure sensor Pp to detect the downstream brake fluid pressure $P_{down}$ on the master cut-off valve MCV1, a detection signal output from the pressure sensor Ps to detect the upstream brake fluid pressure $P_{up}$ on the master cut-off valve MCV2 and a detection signal output from the pressure sensor Ph to detect the wheel cylinder brake fluid pressure.

When the driver reduces the depressing force on the brake pedal 3 (having the displacement of the brake pedal coming closer to 0) and stops electricity from flowing through each solenoid coil of the master cut-off valves MCV1, MCV2 to turn off the master cut-off valves MCV1, MCV2 to have each of the closed master cut-off valves MCV1, MCV2 opened after the above mentioned operation, each of the master cut-off valves MCV1, MCV2 stays stuck in a self-locked state because the wheel cylinder brake fluid pressure that is equal to the down stream brake fluid pressure remains higher than the valve openable pressure on the master cut-off valves MCV1, MCV2.

Accordingly, if the vehicle brake apparatus of a BBW type starts up with the wheel cylinder brake fluid pressure being higher than the valve openable pressure on the master cut-off valves MCV1, MCV2, each of the master cut-off valves MCV1, MCV2, both of which are of a normally open type, becomes stuck in a self-locked state and the braking operation could linger while the upstream brake fluid pressure higher than the valve openable pressure on the master cut-off valves MCV1, MCV2 is being applied to the wheel cylinders.

However the control means 11 of the present embodiment sends an instruction signal to the out-valves 86, 87 functioning as pressure reduction valves to get the closed out-valves 86, 87 of a normally close type to open. As soon as the out-valves 86, 87 becomes open, the brake fluid pressurized on the downstream brake fluid pressure on the master cut-off valves MCV1, MCV2, which is higher than the valve openable pressure, flows through the out-valves and the brake fluid pressure passage 82 to the reservoir 89 and the downstream pressure is quickly reduced.

In the vehicle brake apparatus of the present embodiment, the brake pedal 3 is depressed with the master cut-off valves MCV1, MCV2 being open and a brake fluid pressure that is commensurate with a stroke by which the brake pedal 3 is depressed is generated on the downstream side (wheel cylinder side) of the master cut-off valves MCV1, MCV2, as is explained. If this brake fluid pressure commensurate with how deep the brake pedal 3 is depressed is higher than the valve openable pressure on the master cut-off valves MCV1, MCV2, the differential pressure from the upstream pressure on the master cylinder side of the master cut-off valves MCV1, MCV2 becomes so large that each of the master cut-off valves MCV1, MCV2 becomes stuck in the self-locked state. However, the out-valves 86, 87 are opened on receiving an instruction signal from the control means 11 and the brake fluid pressure higher than the valve openable pressure on the master cut-off valves MCV1, MCV2 is reduced because the brake fluid is allowed to flow toward the reservoir 89 out of the out-valves 86, 87.

As a result, the self-locked state of the master cut-off valves MCV1, MCV2 is quickly relieved in the vehicle brake apparatus of the present embodiment, even if the master cut-off valves MCV1, MCV2 becomes stuck in the self-locked state with the brake fluid pressure on the wheel cylinder being higher than the valve openable pressure on the master cut-off valves MCV1, MCV2 while the brake pedal 3 is being operated.

Figure 4:
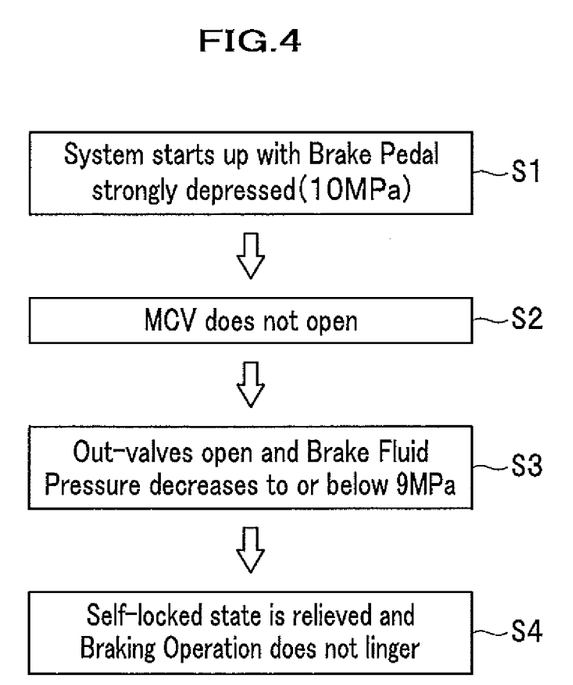
FIG. 4 is a specific flowchart to relieve a self-locked state of a master cut-off valve.

A specific example shown in FIG. 4 is to be explained hereinafter. For instance, assuming that the valve openable pressure on the master cut-off valves MCV1, MCV2 is set to 9 MPa, the brake fluid pressure on the wheel cylinder side, which is commensurate with a stroke by which the brake pedal 3 is depressed, is increased to 10 MPa higher than the valve openable pressure on the master cut-off valves MCV1, MCV2 as soon as the vehicle brake apparatus 2 is started up by switching on the ignition switch IG with the brake pedal 3 being strongly depressed (See Step S1). In this case, the master cut-off valves MCV1, MCV2 are stuck in the self-locked state with the differential pressure from the upstream brake fluid pressure on the master cylinder side and can not be opened from the closed state (Step S2). However, the control means 11 sends the instruction signal to get the out-valves 86, 87 to open and the pressurized brake fluid is allowed to flow through the out-valves 86, 87 toward the reservoir 89. As a result, the brake fluid pressure on the wheel cylinder side is decreased to or below 9 MPa (Step S3). Then, the self-locked state of the master cut-off valves MCV1, MCV2 is quickly relieved and the braking operation is prevented appropriately from lingering (Step S4).

Immediately after the vehicle brake apparatus 2 becomes on by switching on the ignition switch IG when the vehicle brake apparatus 2 is out of operation, the high brake fluid pressure on the wheel cylinder side can not be reduced with the slave cylinder S/C which still to become in operation with the master cut-off valves MCV1, MCV2 still to open.

Figure 5:
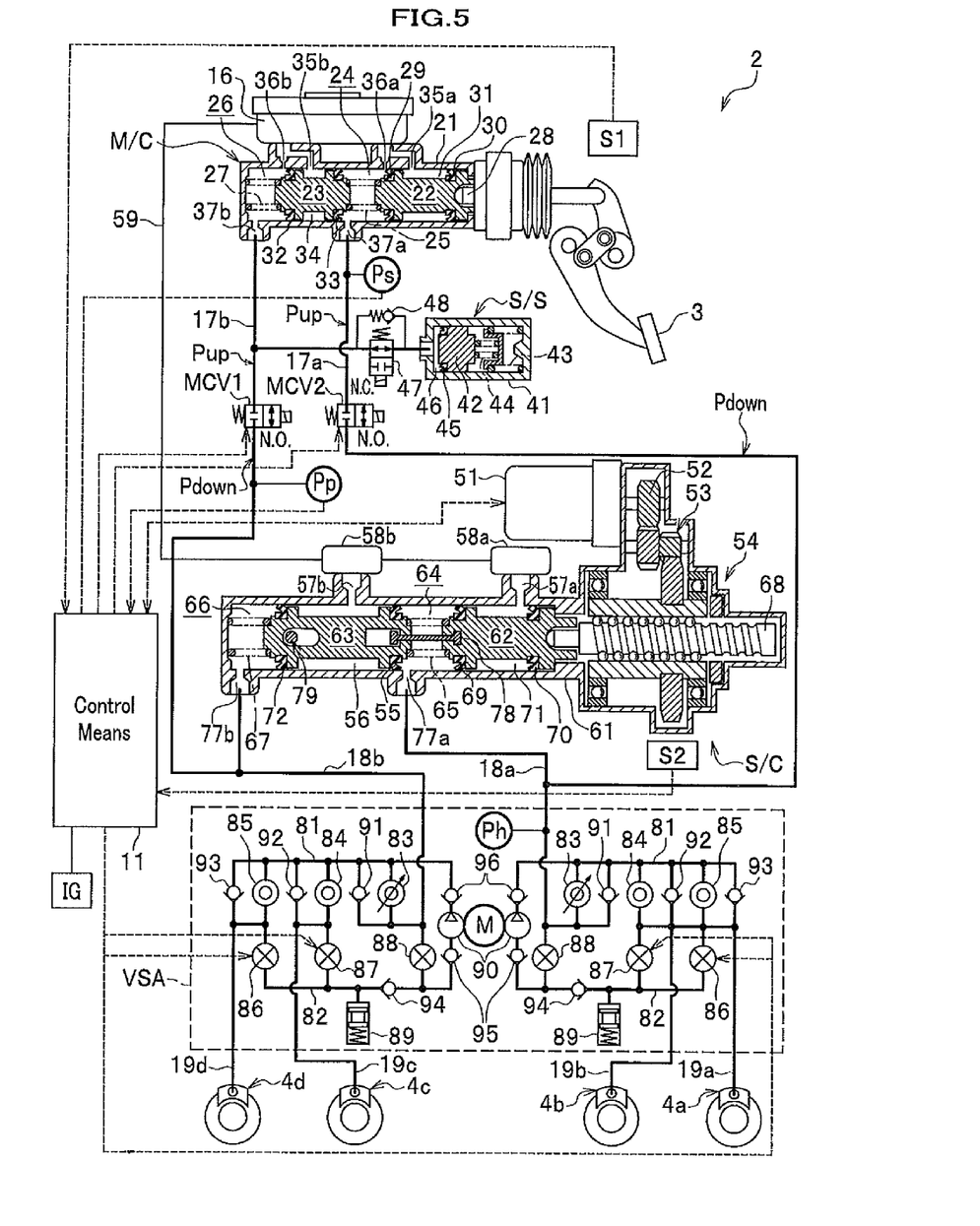
FIG. 5 is a schematic view of a vehicle brake apparatus according to the present invention which is in operation.

FIG. 5 is a schematic view of a vehicle brake apparatus according to an embodiment of the present invention which is in operation. Next, with reference to FIG. 5, an explanation is given on the operation of the vehicle brake apparatus in which the downstream brake fluid pressure on the wheel cylinder side is higher than the valve openable pressure on the master cut-off valves MCV1, MCV2 while the master cut-off valves MCV1, MCV2 are open.

When the braking control operation of the vehicle brake apparatus 2 is started up on switching on the ignition switch IG, electricity starts to flow through the solenoid coils of the master cut-off valves MCV1, MCV2 and the master cut-off valves MCV1, MCV2 become closed as shown in FIG. 5.

When a driver quickly lifts his foot off the brake pedal 3 and has the brake pedal 3 come back to the initial position after the driver depresses the brake pedal 3 so strongly that the brake pedal 3 comes in the vicinity of the floor surface while the master cut-off valves MCV1, MCV2 are closed with the vehicle brake apparatus 2 being in operation, such a high brake fluid as commensurate with the stroke by which the brake pedal is depressed is generated on the wheel cylinder side. This high brake fluid pressure on the wheel cylinder side becomes higher than the valve openable pressure on the master cut-off valves MCV1, MCV2 and the differential pressure across each of the master cut-off valves MCV1, MCV2 between the upstream brake fluid pressure and the downstream brake fluid pressure is so high that the master cut-off valves MCV1, MCV2 become stuck in the self-locked state and are left open.

However, the control means 11 sends the slave cylinder S/C which functions as an electrically brake fluid pressure generating means a control signal to lower the target downstream brake fluid pressure to be generated at the slave cylinder S/C. On lowering the target downstream brake fluid pressure on the slave cylinder S/C, the motor 51 starts to rotate in the opposite direction and the push rod 68, the first piston 63 and the second piston 62 simultaneously move backward. The high brake fluid pressure on the wheel cylinder side is quickly decreased by lowering the target brake fluid pressure to be generated at the slave cylinder S/C, which reduces the wheel cylinder brake fluid pressure.

In this case, the wheel cylinder brake fluid pressure is accurately reduced (controlled) because the slave cylinder S/C is in operation with the master cut-off valves MCV1, MCV2 kept closed.

The control means 11 is capable of simultaneously sending the out-valves 86, 87 an instruction signal to have the closed out-valves 86, 87 opened as well. When the out-valves 86, 87 are opened, the brake fluid pressurized on the downstream brake fluid pressure is allowed to flow through the brake fluid pressure passage 82 toward the reservoir 89. As a result, the wheel cylinder brake fluid pressure is quickly decreased.

As has been explained above, even when the master cut-off valves MCV1, MCV2 become stuck in the self-locked state with the downstream brake fluid pressure being higher than the valve openable pressure on the master cut-off valves MCV1, MCV2 on operating the brake pedal 3, the self-locked state of the master cut-off valves MCV1, MCV2 are quickly relieved by putting the slave cylinder S/C and the out-valves 86, 87 to work in cooperation. In this case, the downstream brake fluid pressure, which is higher than the valve openable pressure on the master cut-off valves MCV1, MCV2, is more efficiently decreased and the self-locked state of the master cut-off valves MCV1, MCV2 is more quickly relieved.

When the downstream brake fluid that is commensurate with the stroke by which the brake pedal 3 is depressed and so high as is generated and left on the wheel cylinder side after, for instance, a driver depresses the brake pedal 3 so strongly as the brake pedal 3 comes in the vicinity of the floor surface and lifts off his foot off the brake pedal 3, the control means 11 may instruct the driver to depress the brake pedal 3 again by putting a notification means not shown to work.

The driver, whom is instructed by the notification means not shown, depresses the brake pedal 3 again and a force, which is attributed to the depressing pressure by the driver himself, is generated and exerted on the valve body 20b of each of the master cut-off valves MCV1, MCV2 and acts in the direction in which each of the master cut-off valves MCV1, MCV2 is made to open. As a result, the closed master cut-off valves MCV1, MCV2 are forcibly and reliably made to open even when the master cut-off valves MCV1, MCV2 become stuck in the self-locked state. Then the upstream brake fluid pressure passage (on the master cylinder side) becomes in communication with the downstream brake fluid pressure passage (on the wheel cylinder side) through the opened master cut-off valves MCV1, MCV2 and the differential pressure between the upstream side and the downstream side is gone.

In this embodiment, each of the out-valves 86, 87 used for a pressure reducing valve is a solenoid valve of a normally close type which are just switched on and off and whose opening can not be varied. However, it should be noted that a well-known valve whose opening is variable may be used for each of the out-valves 86, 87.

What is claimed:

1. A vehicle brake apparatus comprising,
    a cut-off valve of a normally open type connected with wheel cylinders,
    a first brake fluid pressure generating unit which is connected with the wheel cylinders through the cut-off valve and generates a first brake fluid pressure to have wheel cylinders generate a braking force, the first brake fluid pressure being generated in response to a brake pedal being depressed by a driver and applied to the wheel cylinders while the cut-off valve is open,
    a second brake fluid pressure generating unit including an actuator that is electrically driven to generate a second brake fluid pressure, which is applied to the wheel cylinders to generate a braking force, while the cut-off valve is kept closed, the second brake fluid pressure being commensurate with a stroke by which the brake pedal is depressed by the driver,
    a stroke sensor detecting the stroke of the brake pedal,
    a brake fluid pressure detection sensor detecting a brake fluid pressure in a brake fluid passage leading from the cut-off valve toward the wheel cylinders, the brake fluid pressure being either the first brake fluid pressure or the second brake fluid pressure,
    a reservoir connected with the wheel cylinders,
    a pressure reduction valve installed between the wheel cylinders and the reservoir and being opened to make the wheel cylinders in communication with the reservoir to reduce the wheel cylinder pressure, and
    a controller receiving a stroke signal for the stroke of the brake pedal from the stroke sensor and a pressure signal for the brake fluid pressure from the brake fluid pressure detection sensor, driving the actuator based on the received stroke signal and opening the pressure reduction valve, wherein the controller is configured to drive the actuator and to open the pressure reduction valve to reduce the second brake fluid pressure if the controller determines that the detected second brake fluid pressure with the cut-off valve kept closed is higher than the valve openable pressure.

* * * * *